US009508063B2

(12) United States Patent
Wakasa

(10) Patent No.: US 9,508,063 B2
(45) Date of Patent: Nov. 29, 2016

(54) IMAGE READING DEVICE, IMAGE READING SYSTEM, AND CONTROL METHOD OF AN IMAGE READING DEVICE

(71) Applicant: Seiko Epson Corporation, Tokyo (JP)

(72) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/736,701

(22) Filed: Jun. 11, 2015

(65) Prior Publication Data

US 2015/0379482 A1 Dec. 31, 2015

(30) Foreign Application Priority Data

Jun. 25, 2014 (JP) .................................. 2014-129975

(51) Int. Cl.
| | |
|---|---|
| *G06K 9/00* | (2006.01) |
| *G06Q 20/04* | (2012.01) |
| *G06K 19/06* | (2006.01) |
| *G06K 19/14* | (2006.01) |

(52) U.S. Cl.
CPC ....... *G06Q 20/042* (2013.01); *G06K 19/06187* (2013.01); *G06K 19/14* (2013.01)

(58) Field of Classification Search
None
See application file for complete search history.

(56) References Cited

U.S. PATENT DOCUMENTS

| | | | | |
|---|---|---|---|---|
| 8,848,259 | B2* | 9/2014 | Motoyama | G06K 9/186 358/3.28 |
| 2003/0081211 | A1* | 5/2003 | Nishio | H04N 1/4097 356/390 |
| 2008/0111055 | A1* | 5/2008 | Sakai | G01J 1/04 250/205 |
| 2009/0109500 | A1* | 4/2009 | Hasegawa | H04N 1/00681 358/474 |
| 2010/0073128 | A1* | 3/2010 | Talwerdi | G06K 9/00 340/5.8 |
| 2013/0077136 | A1 | 3/2013 | Motoyama | |

FOREIGN PATENT DOCUMENTS

| | | |
|---|---|---|
| JP | 2010-120219 A | 6/2010 |
| JP | 2010-263345 A | 11/2010 |
| JP | 2013-070225 A | 4/2013 |

* cited by examiner

*Primary Examiner* — Nancy Bitar

(57) ABSTRACT

When a second image G2 is acquired by emitting UV light to the surface 2a of a check 2 (medium) in a first operating mode for acquiring images by sequentially emitting visible light and UV light, a check processing device 5 (image reading device) acquires an image based on corrected scanning information acquired by using a first UV light correction value 33UV1 to correct the scanning information output from the reading unit 26. In a second operating mode that acquires images by emitting only UV light, the check processing device 5 acquires an image based on corrected scanning information acquired by using a second UV light correction value 33UV2 to correct the scanning information output from the reading unit 26.

8 Claims, 3 Drawing Sheets

IMAGE READING DEVICE, IMAGE READING SYSTEM, AND CONTROL METHOD OF AN IMAGE READING DEVICE

Priority is claimed under 35 U.S.C. §119 to Japanese Application No. 2014-129975, filed Jun. 25, 2014, which is hereby incorporated by reference in its entirety.

BACKGROUND

1. Technical Field

The present disclosure relates to an image reading device and an image reading system for reading images containing a portion printed with ink that reflects visible light when exposed to ultraviolet light.

2. Related Art

When a check is presented to a financial institution, the check is read by a check processing device, magnetic ink characters printed on the check are magnetically read, and payment is processed based on the acquired magnetic information. Parallel to reading the magnetic ink characters, the check processing device also emits visible light to the front of the check to capture an image of the check, and the financial institution stores the acquired check image as proof of the transaction. When a check bearing an image printed with ink (UV ink) that reflects visible light (fluoresces) when exposed to UV light to prevent forgery is presented to a financial institution, the check processing device reads the front of the check with UV light by exposing it to UV light, and uses the acquired check image to determine the authenticity of the check.

One example of a check processing device that can be used in such check payment processes is described in JP-A-2013-70225. The check processing device described in JP-A-2013-70225 has a magnetic sensor for magnetically reading magnetic ink characters, and an image sensor for optically scanning the check face to capture an image of the check. This check processing device conveys checks through a conveyance path past the magnetic reading position of the magnetic sensor and the scanning position of the image sensor, reads the magnetic ink characters with the magnetic reader, and images the check face with the image sensor. The image sensor emits both visible light and UV light for scanning.

In a device having an image sensor, individual differences in imaging elements and individual differences in photoemitters that emit the scanning light may result in deviation between devices in the hue and tone of the images acquired from the medium. With such devices, therefore, calibration before factory shipping is required to correct the hue and tone of the scanned images, and the scanning data output from the image sensor is corrected based on the correction value set by the calibration process to acquire an image based on the corrected scanning data. A method of calibrating an image forming device is described in JP-A-2010-263345.

The check processing device described in JP-A-2013-70225 uses two scanning methods to acquire a first image of the check by emitting visible light and a second image of the check by emitting UV light. In the first acquisition method, both the first image and the second image are captured while the check travels once through the conveyance path.

In the first acquisition method, the surface of the check is sequentially exposed to visible light and then UV light as the check is conveyed the distance of one line corresponding to the scanning resolution of the image reading device, and the one-line portion of the check exposed to visible light and the one-line portion of the check exposed to UV light are sequentially acquired to capture the first image and the second image.

In the second acquisition method, the check is conveyed twice through the conveyance path. In this second acquisition method, the check is exposed to visible light and the first image is captured while the check passes the scanning position on the first pass, and the check is exposed to UV light and the second image is captured while the check passes the scanning position on the second pass.

If the correction value is set by calibration when scanning the surface of the check by emitting UV light, it should be possible to acquire the same image whether the second image is acquired by the first acquisition method or the second image is acquired by the second acquisition method. However, the color tone (brightness, illuminance) can differ between the second image acquired by the first acquisition method and the second image acquired by the second acquisition method, and identical images cannot be acquired.

Why identical images cannot be acquired by these two acquisition methods is not clear. One conceivable reason is that the amount of light from the light source that emits the UV light is less when sequentially switching from visible light to UV light in the first acquisition method than when the UV light is emitted by the second acquisition method. Remnants of the visible light that is emitted before the UV light is emitted are another possible reason.

SUMMARY

The present disclosure is directed to this problem and provides an image reading device and an image reading system that prevent or suppress differences in images acquired from the surface of media when imaging the surface of the medium by sequentially emitting visible light and UV light and capturing the image when exposed to UV light, and when imaging the surface of the medium by emitting only UV light.

An image reading device according to one aspect of the invention has an imaging element that reads the surface of a medium exposed to a reading light and outputs scanning information; a first light source that emits a first light with a different wavelength than ultraviolet light as the reading light; a second light source that emits an ultraviolet second light as the reading light; and a control unit that controls driving the imaging element, first light source, and second light source. The control unit has a scanning information correction unit that uses a first correction value to correct the scanning information accumulated while the second light is emitted in a first operating mode for reading the surface of the medium by sequentially emitting the first light and then the second light, and uses a second correction value to correct the scanning information accumulated while the second light is emitted in a second operating mode for reading the surface of the medium by emitting only the second light.

In this aspect of the disclosure, the scanning information correction unit corrects the scanning information output from the imaging element using different correction values when visible light and UV light are sequentially emitted and the surface of the medium when exposed to UV light is acquired, and when the surface of the medium is imaged by emitting only UV light. Differences in the images of the medium can therefore be prevented or suppressed even when the medium is read in different operating modes.

An image reading device according to another aspect of the disclosure also has an image acquisition unit that acquires an image of the medium based on the scanning information corrected by the scanning information correction unit. Thus comprised, identical images or images with little difference therebetween can be acquired even in different operating modes.

An image reading device according to another aspect of the disclosure also has a conveyance mechanism that conveys the medium past the image reading position of the imaging element. The control unit controls driving the conveyance mechanism, and emits the second light and the first light while advancing the medium the conveyance distance of one line corresponding to the scanning resolution at the image reading position in the first operating mode.

Thus comprised, while the medium is conveyed once through the conveyance path in the first operating mode, reading the surface of the medium when the first light is emitted can proceed parallel to reading the surface of the medium when the second light is emitted.

Further preferably, an image reading device according to another aspect of the disclosure also has a storage unit storing the first correction value and the second correction value.

Thus comprised, the first correction value and second correction value can be set by factory calibration, and the set first correction value and second correction value stored in the storage unit. The scanning information correction unit can then get the first correction value and the second correction value from the storage unit.

Further preferably, the first correction value is set based on scanning information accumulated by the imaging element while the second light is emitted when the first light and then the second light are sequentially emitted within a specific time to the surface of a predetermined reference member and the surface of the reference member is imaged.

Thus comprised, the first correction value can be set by scanning a reference member with the imaging element in the calibration process.

Further preferably, the second correction value is set based on scanning information accumulated by the imaging element when the surface of the predetermined reference member is imaged by exposing the reference member to only the second light.

Thus comprised, the second correction value can be set by scanning a reference member with the imaging element in the calibration process.

Another aspect of the disclosure is an image reading system including the image reading device described above; and an operating mode setting device that sets the operating mode of the image reading device to the first operating mode or the second operating mode.

Thus comprised, the operating mode setting device can set the operating mode of the image reading device to the desired mode.

Other objects and attainments together with a fuller understanding of the disclosure will become apparent and appreciated by referring to the following description and claims taken in conjunction with the accompanying drawings.

DESCRIPTION OF EMBODIMENTS

A preferred embodiment of a check processing device as an example of an image reading device according to the present disclosure is described below with reference to the accompanying figures.

Check Processing Device

Figure 1A:
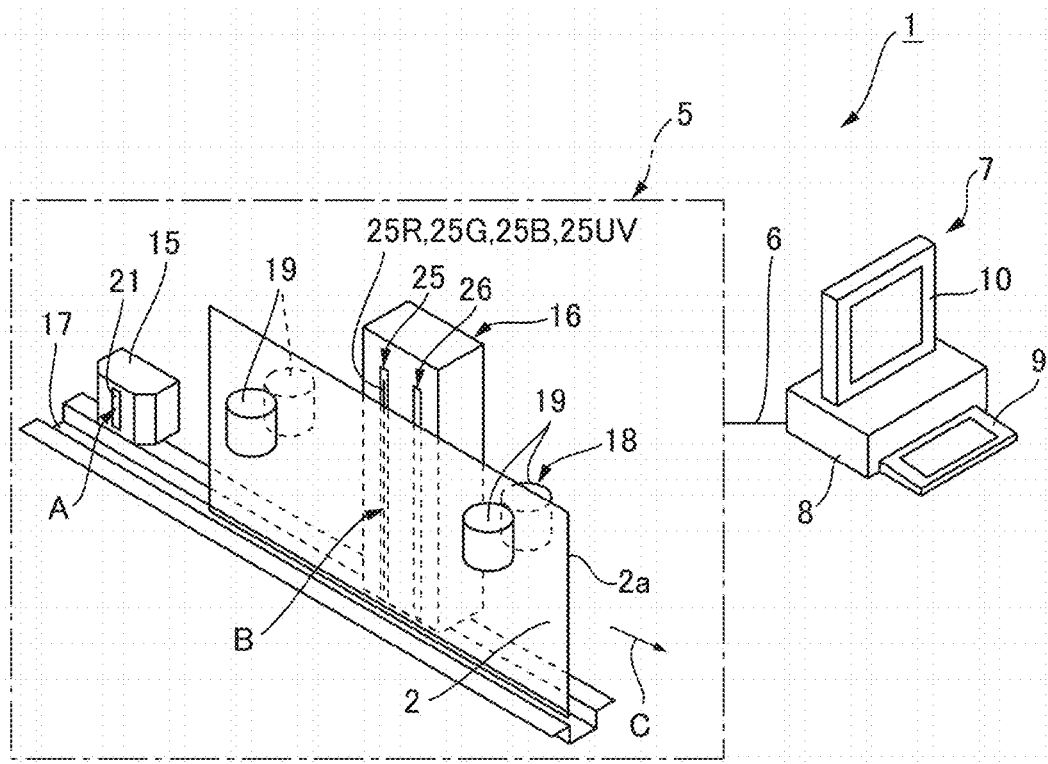
FIG. 1A and FIG. 1B illustrate a check processing system according to the disclosure.
Figure 1B:
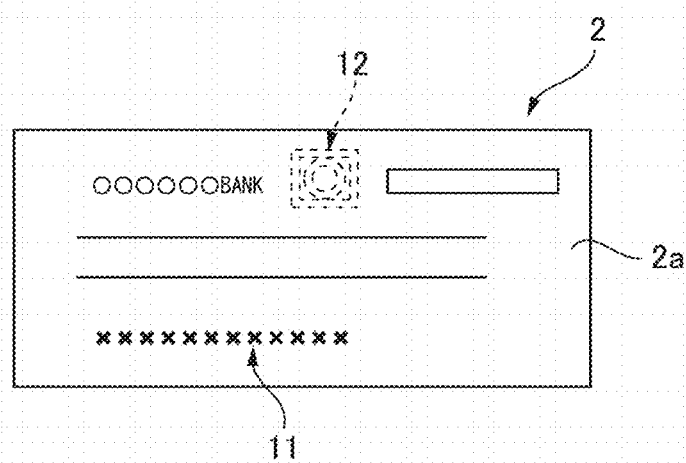

FIG. 1A illustrates a check processing system, and FIG. 1B shows an example of a check. The check processing system (image reading system) 1 executes a payment process using a check 2. As shown in FIG. 1A, the check processing system 1 includes a check processing device 5, and a control device (operating mode setting device) 7 connected to the check processing device 5 through a cable 6. The control device 7 includes a main unit 8, an input device 9 connected to the main unit 8, and a display 10. The main unit 8 is a computer.

When a check 2 is presented to a financial institution, the check processing device 5 acquires the magnetic information printed on the check 2 and images of the surface of the check 2. The control device 7 sends a control command for controlling the check processing device 5 to the check processing device 5. The control device 7 also receives magnetic information acquired by the check processing device 5, and executes a payment process based on the magnetic information and input information input from the input device 9. The control device 7 receives the image of the check 2 acquired by the check processing device 5, and stores the image with the magnetic information.

A line of magnetic ink characters 11 expressing a customer account number and other information printed in magnetic ink is printed on the surface 2a of the check 2 presented to the financial institution as shown in FIG. 1B. A copy-protection image 12 is also printed on the surface 2a of the check 2 using UV ink that reflects visible light (fluoresces) when exposed to UV light.

As shown in FIG. 1A, the check processing device 5 has a magnetic sensor 15, an image sensor 16, and a conveyance path 17 going past the magnetic reading position A of the magnetic sensor 15 and the image reading position B of the image sensor 16. The check processing device 5 also has a conveyance mechanism 18 that conveys a check 2 inserted to the conveyance path 17 through the conveyance path 17 passing the magnetic reading position A and image reading position B. The conveyance mechanism 18 has a conveyance roller pair 19 that holds and conveys the check 2 inserted to the conveyance path 17, and a conveyance motor 20 (see FIG. 2) that drives the conveyance roller pair 19.

The magnetic sensor 15 is disposed with the magnetic reading surface 21 facing the conveyance path 17. The magnetic sensor 15 reads the magnetic ink characters 11 from the check 2 passing the magnetic reading position A.

The image sensor 16 is a CIS (contact image sensor) module that emits reading light to the check 2 passing the image reading position B and captures the reflection of the reading light from the check 2. The image sensor 16 is disposed with the photoemitter unit (light source) 25 and reading unit (imaging element) 26 facing the conveyance path 17.

The photoemitter unit 25 is disposed in a vertical line perpendicular to the conveyance direction C. The photoemitter unit 25 includes as light elements a plurality of red photoemission elements 25R that emit red light (first light beam), a plurality of green photoemission elements 25G that emit green light (first light beam), a plurality of blue photoemission elements 25B that emit blue light (first light beam), and a plurality of UV photoemission elements 25UV that emit ultraviolet light (second light beam). The multiple photoemission elements 25R, 25G, 25B, and 25UV that emit respective colors of light are disposed in vertical lines. Note that the alternatively to having the multiple photoemission elements arrayed in lines, the photoemitter unit 25 may be configured with photoemission elements for each color disposed to ends of light guides extending vertically.

The reading unit 26 is displayed in a vertical line along the photoemitter unit 25. The reading unit 26 is an imaging element such as a CMOS sensor. The reading unit 26 (imaging element) sequentially reads one vertical line at a time from the check 2 passing the image reading position B time to emission of the reading light to the check 2.

The check processing device 5 has a first operating mode and a second operating mode as operating modes of the check processing operation.

The first operating mode is for processing transactions by checks 2. In the first operating mode, magnetic information is acquired by reading the magnetic ink characters 11 with the magnetic sensor 15, and the surface 2a of the check 2 is scanned with the image sensor 16 to capture a first image and a second image. The first image is a gray scale (composite gray) image acquired by exposing the check 2 to visible light (red light, blue light, green light), and the second image is a gray scale image acquired by exposing the check 2 to UV light. The check processing device 5 then sends the acquired magnetic information, first image, and second image to the control device 7.

The second operating mode is for executing an authentication process that determines if the check 2 is authentic. In the second operating mode the surface 2a of the check 2 is scanned by the image sensor 16 to acquire a single image. This image is the image acquired when the check 2 is exposed to UV light. The check processing device 5 also sends this acquired image to the control device 7.

Control System

Figure 2:
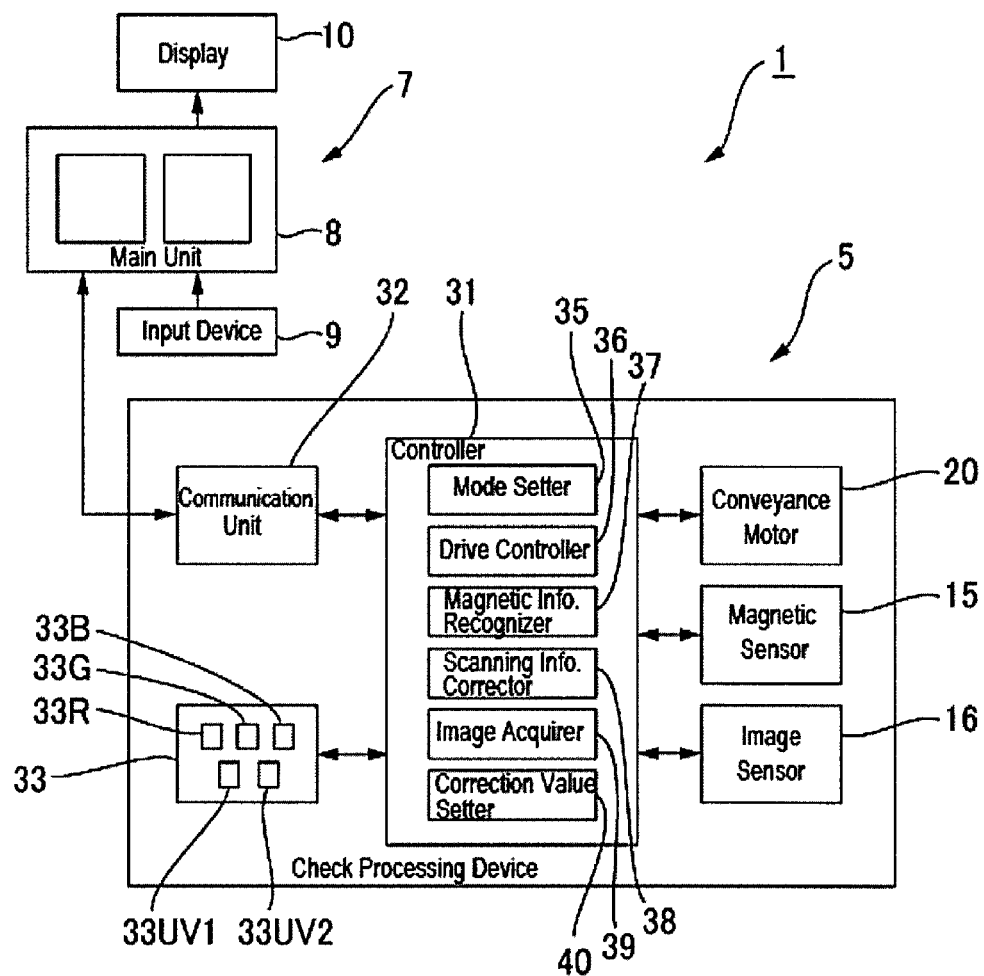
FIG. 2 is a block diagram of the control system of the check processing system.

FIG. 2 is a block diagram illustrating the control system of the check processing system 1. As shown in FIG. 2, the control system of the check processing device 5 is configured around a control unit 31 comprising a CPU and image rendering memory. A communication unit 32 with a communication interface for communicating with the control device 7 is connected to the control unit 31. The conveyance motor 20, magnetic sensor 15, and image sensor 16 are also connected to the control unit 31 through drivers not shown. A correction value storage unit 33 (storage unit) is also connected to the control unit 31. The correction value storage unit 33 stores a red light correction value 33R, green light correction value 33G, blue light correction value 33B, first UV light correction value 33UV1, and second UV light correction value 33UV2.

The control unit 31 includes a mode setting unit 35 that sets the operating mode of the check processing operation to the first operating mode or the second operating mode based on an operating mode setting command supplied from the control device 7 through the communication unit 32. The control unit 31 also has a drive control unit 36, magnetic information recognition unit 37, scanning information correction unit 38, image acquisition unit 39, and correction value setting unit 40.

The drive control unit 36 controls driving the conveyance motor 20, magnetic sensor 15, and image sensor 16.

When the operating mode is set to first operating mode and a start process command is supplied from the control device 7, the drive control unit 36 drives the conveyance motor 20 and conveys the check 2 through the conveyance path 17. The drive control unit 36 also drives the magnetic sensor 15 to read the magnetic ink characters 11 from the check 2 as it passes the magnetic reading position A of the magnetic sensor 15, and drives the image sensor 16 to image the surface 2a of the check 2 as it passes the image reading position B of the image sensor 16.

To read the surface 2a of the check 2 with the image sensor 16 in the first operating mode, the drive control unit 36 sequentially emits red light, green light, blue light, and then UV light to the surface 2a of the check 2 from the photoemitter unit 25 while the check 2 is conveyed past the image reading position B in increments of one line appropriate to the scanning resolution. Each time the check 2 is conveyed the distance of one line, the drive control unit 36 successively reads the one-line portion of the check 2 exposed to red light, the one-line portion of the check 2 exposed to green light, the one-line portion of the check 2 exposed to blue light, and the one-line portion of the check 2 exposed to UV light.

When the operating mode is set to second operating mode and a start process command is supplied from the control device 7, the drive control unit 36 drives the conveyance motor 20 and conveys the check 2 through the conveyance path 17 while driving the image sensor 16 to read the surface 2a of the check 2 passing the image reading position B of the image sensor 16.

To read the surface 2a of the check 2 with the image sensor 16 in the second operating mode, the drive control unit 36 sequentially emits only UV light to the surface 2a of the check 2 from the photoemitter unit 25 while the check 2 is conveyed past the image reading position B in increments of one line. Each time the check 2 is advanced the amount of one line, the drive control unit 36 successively reads the one-line portion of the check 2 exposed to UV light.

The magnetic information recognition unit 37 recognizes the magnetic ink characters 11 based on the magnetic reading information (detection signal) read by the magnetic sensor 15 from the magnetic ink characters 11 of the check 2 passing the magnetic reading position A. The magnetic ink characters 11 are recognized by comparing the magnetic information output from the magnetic sensor 15 with previously stored signal waveform patterns for the magnetic ink characters 11. The magnetic information recognition unit 37 acquires the results of magnetic ink character 11 recognition as magnetic information. The magnetic information recognition unit 37 then sends the acquired magnetic information to the control device 7.

The scanning information correction unit 38 corrects the scanning information output from the reading unit 26 (imaging element) with the correction values stored in the correction value storage unit 33.

More specifically, when the operating mode is set to the first operating mode, the scanning information correction unit 38 corrects the scanning information accumulated by the reading unit 26 while red light is emitted with the red light correction value 33R, corrects the scanning information accumulated by the reading unit 26 while green light is emitted with the green light correction value 33G, corrects the scanning information accumulated by the reading unit 26 while blue light is emitted with the blue light correction value 33B, and corrects the scanning information accumulated by the reading unit 26 while UV light is emitted with the first UV light correction value 33UV1.

When the operating mode is set to the second operating mode, the scanning information correction unit 38 corrects the scanning information accumulated by the reading unit 26 while UV light is emitted with the second UV light correction value 33UV2.

The image acquisition unit 39 acquires an image of the check 2 based on the corrected scanning information, which is the scanning information after correction by the scanning information correction unit 38.

Figure 3A:
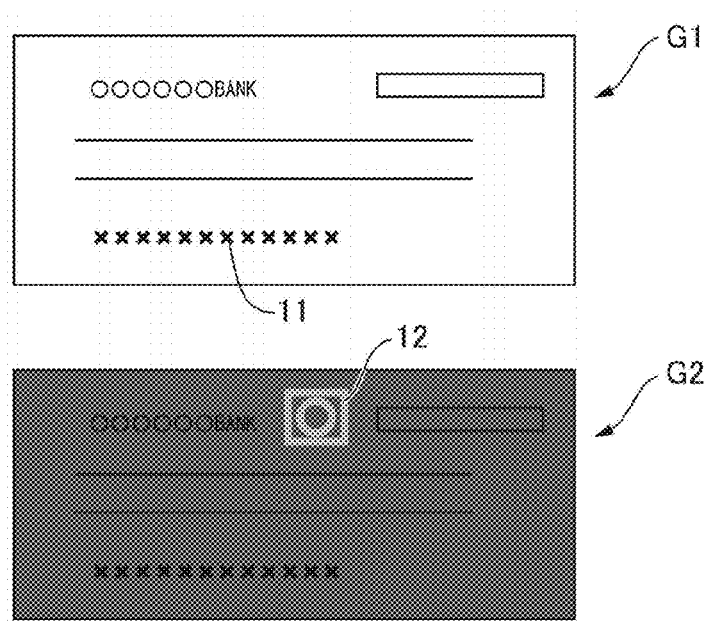
FIGS. 3A, 3B and 3C illustrate examples of check images captured by the check processing system.
Figure 3B:
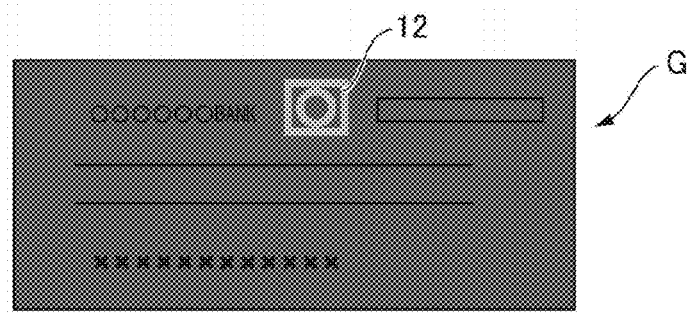
Figure 3C:
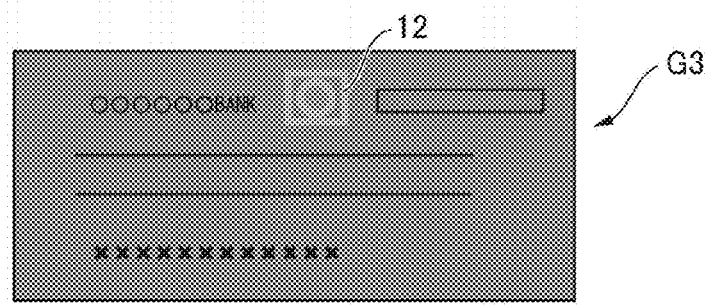

More specifically, when the operating mode is set to the first operating mode, the image acquisition unit 39 acquires a first image G1 (see FIG. 3 (*a*)) based on the corrected scanning information acquired by correcting the scanning information accumulated by the reading unit 26 while red light is emitted with the red light correction value 33R, the corrected scanning information acquired by correcting the scanning information accumulated by the reading unit 26 while green light is emitted with the green light correction value 33G, and the corrected scanning information acquired by correcting the scanning information accumulated by the reading unit 26 while blue light is emitted with the blue light correction value 33B.

The image acquisition unit 39 also acquires a second image G2 (FIG. 3 (*a*)) based on the corrected scanning information acquired by correcting the scanning information accumulated by the reading unit 26 while UV light is emitted with the first UV light correction value 33UV1.

When the operating mode is set to the second operating mode, the image acquisition unit 39 acquires an image G (FIG. 3 (*b*)) based on the corrected scanning information acquired by correcting the scanning information accumulated by the reading unit 26 while UV light is emitted with the second UV light correction value 33UV2.

The image acquisition unit 39 then sends the acquired images (first image G1, second image G2, and image G) to the control device 7.

During factory calibration of the check processing device 5, the correction value setting unit 40 sets the red light correction value 33R, green light correction value 33G, blue light correction value 33B, first UV light correction value 33UV1, and second UV light correction value 33UV2, and stores the set correction values 33R, 33G, 33B, 33UV1, 33UV2 in the correction value storage unit 33.

The calibration process in this example includes a first calibration that sets the red light correction value 33R, green light correction value 33G, blue light correction value 33B, and first UV light correction value 33UV1, and a second calibration that sets the second UV light correction value 33UV2.

In the first calibration, a reference sheet is inserted to the image reading position B of the conveyance path 17, the reference sheet is sequentially exposed to red, green, blue, and then UV light at a specific timing interval, and the surface of the reference sheet when exposed to UV light is imaged by the image sensor 16. This specific interval is an interval corresponding to the interval at which the four colors of light are emitted in the first operating mode. This scanning operation is repeated multiple times during the first calibration. The reference sheet is a sheet with a white surface, for example.

For each color of light, the correction value setting unit 40 acquires the scanning information accumulated by the reading unit 26 while each color of light is emitted in each scanning operation. The correction value setting unit 40 calculates the average of plural readings acquired for each color of light, and compares the average of the scanning information for each color with a reference value previously set for each color. The correction value setting unit 40 then sets a value (such as the difference between the calculated average of the readings and the set reference value) that corrects the calculated average to the reference value as the correction value for each color. As a result, the red light correction value 33R, green light correction value 33G, blue light correction value 33B, and first UV light correction value 33UV1 are set.

In the second calibration, a reference sheet is inserted to the image reading position B of the conveyance path 17, the reference sheet is exposed to only UV light, and the surface of the reference sheet when exposed to UV light is imaged by the image sensor 16. This scanning operation is repeated multiple times during the second calibration.

In this case, the correction value setting unit 40 acquires the scanning information accumulated by the reading unit 26 while UV light is emitted in each scanning operation. The correction value setting unit 40 calculates the average of plural readings, and compares the average of the readings with a reference value previously set for UV light. The correction value setting unit 40 then sets a value (such as the difference between the calculated average of the readings and the set reference value) that corrects the calculated average to the reference value as the correction value for UV light. As a result, the second UV light correction value 33UV2 is set.

Note that the correction values 33R, 33G, 33B, 33UV1, 33UV2 are set for each pixel of the reading unit 26 (imaging element). The correction values 33R, 33G, 33B, 33UV1, 33UV2 may alternatively be set as a function or a table.

The control device 7 has a check processing device control unit 51 and a transaction processing unit 52. The check processing device control unit 51 sends an operating mode setting command that sets the operating mode of the check processing device 5 to the first operating mode or the second operating mode to the check processing device 5. The check processing device control unit 51 also sends a start process command that starts the check processing operation to the check processing device 5.

When the operating mode of the check processing device 5 is set to the first operating mode, the transaction processing unit 52 executes a transaction process based on magnetic information such as the account number received from the check processing device 5, and input information such as an amount input to the control device 7 through the input device 9. The transaction processing unit 52 also displays the first image G1 or second image G2 received from the check processing device 5 on the display 10. The transaction processing unit 52 also stores the images G1 and G2 relationally to transaction information such as the transaction date, magnetic information, and input information.

When the operating mode of the check processing device 5 is set to the second operating mode, the transaction processing unit 52 displays the image G received from the check processing device 5 on the display 10. The transaction processing unit 52 also relationally stores the image G to information such as the date the check 2 was presented.

Check Processing Operation

FIG. 3 illustrates images of a check 2 acquired by the check processing device 5. When a transaction process is executed by the financial institution to which the check 2 is presented, a operating mode setting command is sent from the control device 7 to the check processing device 5, and the operating mode of the check processing device 5 is set to the first operating mode. Next, the check 2 is inserted to the conveyance path 17 of the check processing device 5, and a start process command is sent from the control device 7 to the check processing device 5.

As a result, the check processing device 5 conveys the check 2 through the conveyance path 17, reads the magnetic ink characters 11 printed on the check 2 with the magnetic sensor 15 and acquires magnetic information. The check processing device 5 also images the surface 2a of the check 2 with the image sensor 16, and acquires the first image G1 and second image G2. The check processing device 5 also sends the magnetic information, first image G1, and second image G2 to the control device 7.

When the control unit 31 receives the magnetic information, first image G1, and second image G2 from the check processing device 5, the first image G1 and second image G2 are displayed on the display 10. The first image G1 and second image G2 are as shown in FIG. 3 (a), for example. The top image in FIG. 3 (a) illustrates an example of the first image G1 acquired by exposure to visible light in the first operating mode. The bottom image in FIG. 3 (a) illustrates an example of the second image G2 acquired by exposure to UV light.

The operator checks the authenticity of the check 2 based on the second image G2 displayed on the display 10. More specifically, the operator checks the copy-protection image 12 appearing in the second image G2 on the display 10. The operator also confirms the information written on the face of the check 2 based on the first image G1 or the check 2 itself, and inputs the information required for the transaction to the main unit 8 through the input device 9. When the required transaction information is input, the transaction process is executed based on the input information and the magnetic information. When the transaction is completed, the control device 7 relationally stores the first image G1 and second image G2 with the transaction information including the transaction date, magnetic information, and input information, for example.

To execute the authentication process on the check 2 when a check 2 is presented to the financial institution, the control device 7 sends an operating mode setting command to the check processing device 5 and sets the operating mode of the check processing device 5 to the second operating mode. Next, the check 2 is inserted to the conveyance path 17 of the check processing device 5, and the control device 7 sends a start process command to the check processing device 5.

As a result, the check processing device 5 conveys the check 2 through the conveyance path 17, and the image sensor 16 acquires an image G of the surface 2a of the check 2. The check processing device 5 then sends this image to the control device 7.

When the control unit 31 receives the image G from the check processing device 5, the image G is displayed on the display 10. This image G displayed on the display 10 is as shown in FIG. 3 (b), for example. FIG. 3 (b) illustrates an example of the image G acquired by exposure to UV light in the second operating mode.

The operator then checks the authenticity of the check 2 based on the image G displayed on the display 10. More specifically, the operator checks the copy-protection image 12 appearing in the image G on the display 10. The control device 7 then relationally stores the image G and the date the check 2 was presented.

Effect of the Disclosure

In this example, different correction values (first correction value or second correction value) are used to correct the scanning information output from the reading unit 26 is and acquire a corrected image when the second image G2 of the surface 2a of the check 2 is acquired by exposure to UV light in the first operating mode, and when an image G of the surface 2a of the check 2 is acquired by exposure to UV light in the second operating mode. As a result, the second image G2 acquired in the first operating mode, and the image G acquired in the second operating mode using a different type of light than in the first operating mode, will be identical images or images with substantially no difference therebetween.

In this example, a red light correction value 33R, green light correction value 33G, blue light correction value 33B, first UV light correction value 33UV1, and second UV light correction value 33UV2 are set by a calibration process, and these correction values are stored in a correction value storage unit 33. As a result, the scanning information correction unit 38 can acquire the correction values 33R, 33G, 33B, 33UV1, 33UV2 by referencing the storage unit, and can easily correct the scanning information to acquire corrected scanning information.

When the same correction value is used to correct the second image G2 acquired by exposing the surface 2a of the check 2 to UV light in the first operating mode, and the image G of the surface 2a of the check 2 acquired by exposing to UV light in the second operating mode, differences may appear in the second image G2 and the image G.

FIG. 3 (c) illustrates an image acquired by the image acquisition unit 39 when the second UV light correction value 33UV2 is used as the correction value to correct the second image G2 acquired by exposure to UV light in the first operating mode. As shown in FIG. 3 (c), when the second UV light correction value 33UV2 is applied to the second image G2 acquired in the first operating mode, the acquired image G3 has higher overall brightness (illuminance) than the image G acquired in the second operating mode, and recognition of the copy-protection image 12 is more difficult.

Other Embodiments

In the first operating mode, the check processing device 5 may sequentially expose the surface 2a of the check 2 to red light and UV light while the check 2 is conveyed in one-line increments based on the scanning resolution in the first operating mode, capture a first image when the surface 2a of the check 2 is exposed to red light, and capture a second image G2 during exposure to UV light.

Likewise in the first operating mode, the surface 2a of the check 2 may be sequentially exposed to green light and UV light to capture a first image when the surface 2a of the check 2 is exposed to green light, and capture a second image G2 during exposure to UV light.

Further alternatively in the first operating mode, the surface 2a of the check 2 may be sequentially exposed to blue light and UV light to capture a first image when the surface 2a of the check 2 is exposed to blue light, and capture a second image G2 during exposure to UV light.

Further alternatively, a color image can be captured as the first image in the first operating mode.

In any of these cases, if the first UV light correction value 33UV1 is used as the correction value when the second image G2 is acquired by exposure to UV light in the first operating mode, and the second UV light correction value 33UV2 is used as the correction value when acquiring the image G using UV light in the second operating mode, a difference between the second image acquired in the first operating mode and the image acquired in the second operating mode can be prevented or suppressed.

Further alternatively, the check processing device 5 may include a pair of image sensors 16 disposed on opposite sides of the conveyance path 17 at the image reading position B, and acquire a front image and a back image of the check 2. An image recognition unit may also be provided for image recognition of text or other information on the surface 2a of the check 2 based on the first image G1. Further alternatively, the check processing system 1 may be configured with the magnetic information recognition unit 37 and image acquisition unit 39 of the check processing device 5 on the control device 7 side. In this case, the magnetic reading information and corrected scanning information are sent from the check processing device 5 to the control device 7.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A check processing device comprising:
    an imaging element that reads the surface of a check exposed to reading light and outputs scanning information;
    a first light source that emits a first light with a different wavelength than ultraviolet light as the reading light;
    a second light source that emits an ultraviolet second light as the reading light; and
    a controller that controls driving the imaging element, first light source, and second light source, and includes
    a scanning information corrector that uses a first correction value to correct the scanning information accumulated while the second light is emitted in a first operating mode for reading the surface of the check by sequentially emitting the first light and then the second light, and
    uses a second correction value to correct the scanning information accumulated while the second light is emitted in a second operating mode for reading the surface of the check by emitting only the second light;
    wherein the first correction value is set based on a reference value previously set for the second light and an average of scanning information accumulated by the imaging element while the second light is emitted when the first light and then the second light are sequentially emitted within a specific time to the surface of a reference member and the surface of the reference member is imaged, and
    wherein the second correction value is set based on the reference value previously set for the second light, and an average of scanning information accumulated by the imaging element when the surface of the reference member is imaged by exposing the reference member to only the second light.

2. The check processing device described in claim 1, further comprising:
    an image acquirer that acquires an image of the check based on the scanning information corrected by the scanning information corrector.

3. The check processing device described in claim 1, further comprising:
    a conveyance mechanism that conveys the check past the check processing position of the imaging element;
    the controller controlling driving the conveyance mechanism, and emitting the second light and the first light while advancing the check the conveyance distance of one line corresponding to the scanning resolution at the check processing position in the first operating mode.

4. The check processing device described in claim 1, further comprising:
    a storage storing the first correction value and the second correction value.

5. A check processing system comprising:
    the check processing device described in claim 1; and
    an operating mode setting device that sets the operating mode of the check processing device to the first operating mode or the second operating mode.

6. A control method of a check processing device, comprising:
    correcting by a first correction value scanning information that is accumulated while a second light is emitted in a first operating mode for reading the surface of a check with an imaging element by sequentially emitting a first light with a different wavelength than ultraviolet light as the reading light and then an ultraviolet second light as the reading light;
    correcting by a second correction value scanning information that is accumulated while the second light is emitted in a second operating mode for reading the surface of a check with an imaging element by emitting only the second light as the reading light;
    setting the first correction value on scanning information accumulated by the imaging element while the second light is emitted when the first light and then the second light are sequentially emitted within a specific time to the surface of a reference member and the surface of the reference member is imaged; and
    setting the second correction value based on scanning information accumulated by the imaging element when the surface of the reference member is imaged by exposing the reference member to only the second light.

7. The control method of check processing device described in claim 6, further comprising:
    acquiring an image of the check based on scanning information corrected by the first correction value and the second correction value.

8. The check processing device described in claim 1, wherein:
    the first operating mode is for processing transactions by checks, and
    the second operating mode is for executing an authentication process that determines if the check is authentic.

* * * * *